UNITED STATES PATENT OFFICE.

ROBERT E. SCHMIDT, OF ELBERFELD, GERMANY, ASSIGNOR TO FARBENFABRIKEN OF ELBERFELD CO., OF NEW YORK, N. Y.

BLUE ANTHRAQUINONE DYE AND PROCESS OF MAKING SAME.

SPECIFICATION forming part of Letters Patent No. 675,572, dated June 4, 1901.

Application filed December 29, 1900. Serial No. 41,476. (Specimens.)

*To all whom it may concern:*

Be it known that I, ROBERT E. SCHMIDT, doctor of philosophy, chemist, (assignor to the FARBENFABRIKEN OF ELBERFELD COMPANY, of New York,) residing at Elberfeld, Germany, have invented a new and useful Improvement in Blue Anthraquinone Dyes and Processes of Making Same; and I hereby declare the following to be a clear and exact description of my invention.

My invention relates to the manufacture of new blue dyestuff sulfonic acids of the anthracene series by causing sulfonating agents to act on anthraquinone derivatives having the following general formula:

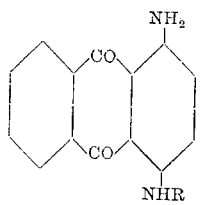

(R meaning in this formula an alphyl radical, such as phenyl, tolyl, xylyl, or the like.) The said anthraquinone derivatives can be obtained, for instance, by heating $alpha_1$-$alpha_2$-amidoöxyanthraquinone, having the formula

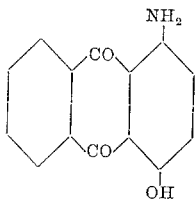

with primary aromatic amins—such as anilin, paratoluidin, xylidin, or the like—in the presence of condensing agents, such as boric acid or the like.

In this process the hydroxy group is replaced by an alphylamido radical and the condensation products of the above-given general formula are produced. The said bodies can also be obtained by treating, for instance, $alpha_1$-$alpha_2$-nitroamidoanthraquinone with the above-mentioned aromatic amins. By this operation the nitro group is replaced by an alphylamido radical. The new dyestuff sulfonic acids thus obtained are, in a dry state, dark powders which are soluble in water and in ammonia with a blue color. They dye unmordanted and chrome-mordanted wool fast blue shades. In order to produce the said amidoalphylamidoanthraquinones, I can proceed as follows, the parts being by weight: Ten parts of $alpha_1$-$alpha_2$-amidoöxyanthraquinone are mixed with one hundred parts of paratoluidin and five parts of crystallized boric acid. This resulting mixture is heated to about from 140° to 160° centigrade until the color of the melt turns from red to blue. After the reaction mass has been allowed to cool it is mixed with methylic alcohol, by means of which operation the condensation product separates after some time in the shape of dark-blue crystals. Subsequently it is filtered off and dried. The resulting body is readily soluble in chloroform, pyridin, and anilin with an intense blue color. It is soluble with difficulty in methyl and ethyl alcohol. In order to transform this condensation product into the new dyestuff sulfonic acid, ten parts of the finely-pulverized compound are stirred into from one hundred to two hundred parts of sulfuric monohydrate. The resulting solution is then heated to about from 60° to 100° centigrade until a test portion is clearly dissolved by a large quantity of hot water. Subsequently the reaction mass is poured into about from one thousand to two thousand parts of water, by means of which operation the new dyestuff sulfonic acid, which is very difficultly soluble in dilute acids, is precipitated. It is filtered off, washed with a solution of common salt, and dried.

When dry and pulverized, the new coloring-matter is a dark-blue powder, which is rather difficultly soluble in cold and more soluble in hot water with a blue color. It is easily soluble in ammonia, in ethyl alcohol, (of ninety per cent.,) and in acetic acid, (of fifty per cent.) with a blue color. By the addition of hydrochloric acid to its watery solution the color of the latter turns redder, and by the addition of ammonia to this acid solution the original blue color is again produced. By concentrated sulfuric acid (of 66° Baumé) it is dissolved, yielding a violet solution, the color of which changes into red on the addition of a small quantity of ice, while on adding a larger quantity of ice the dyestuff sulfonic acid is separated in the shape of a dark precipitate. It dyes unmordanted and chrome-mordanted wool blue shades fast to light and to alkalies.

Having now described my invention and in what manner the same is to be performed, what I claim as new, and desire to secure by Letters Patent, is—

1. The process for producing new anthraquinone dyestuffs, which process consists in first treating alpha$_1$-amido-alpha$_2$-alphylamidoanthraquinones having the following general formula:

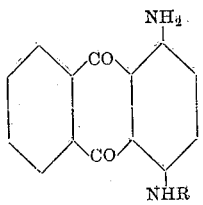

in which formula R means an alphyl radical, with sulfonating agents and then isolating the resulting dyestuff sulfonic acids from the reaction mixture, substantially as hereinbefore described.

2. The process for producing a new anthraquinone dyestuff, which process consists in first treating alpha$_1$-amido-alpha$_2$-para-tolylamidoanthraquinone having the formula:

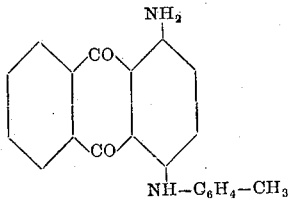

with sulfonating agents, and then isolating the resulting dyestuff sulfonic acid from the reaction mixture, substantially as hereinbefore described.

3. The herein-described new dyestuff sulfonic acids, obtainable by sulfonating alpha$_1$-amido - alpha$_2$ - alphylamidoanthraquinones, which dyestuffs, when dry and pulverized, are dark powders soluble in water and in ammonia with a blue color, dyeing unmordanted and chrome-mordanted wool fast-blue shades, substantially as hereinbefore described.

4. The herein-described new dyestuff sulfonic acid, obtainable by sulfonating alpha$_1$-amido-alpha$_2$-paratolylamidoanthraquinone, which dyestuff is, when dry and pulverized, a dark-blue powder being rather difficultly soluble in cold and more soluble in hot water with a blue color, being easily soluble in ammonia, in ethyl alcohol (of ninety per cent.) and in acetic acid (of fifty per cent.) with a blue color, the color of its watery solution turning redder by the addition of hydrochloric acid and the original blue color being produced again by adding ammonia to the acid solution; being dissolved by concentrated sulfuric acid (of 66° Baumé) yielding a violet solution the color of which changes into red on the addition of a small quantity of ice, while on adding a larger quantity of ice the dyestuff sulfonic acid separates in the shape of a dark precipitate; dyeing unmordanted and chrome-mordanted wool blue shades fast to light and to alkalies, substantially as hereinbefore described.

In testimony whereof I have signed my name in the presence of two subscribing witnesses.

ROBERT E. SCHMIDT.

Witnesses:
OTTO KÖNIG,
J. A. RITTERSHAUS.